(12) United States Patent
Kanai

(10) Patent No.: US 8,649,067 B2
(45) Date of Patent: Feb. 11, 2014

(54) DOCUMENT RETRIEVING/PRINTING SYSTEM, DIGITAL MULTI-FUNCTION MACHINE, DOCUMENT RETRIEVING/PRINTING METHOD, AND PROGRAM

(75) Inventor: Yoichi Kanai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 365 days.

(21) Appl. No.: 12/735,634

(22) PCT Filed: Feb. 4, 2009

(86) PCT No.: PCT/JP2009/052256
§ 371 (c)(1),
(2), (4) Date: Aug. 4, 2010

(87) PCT Pub. No.: WO2009/104502
PCT Pub. Date: Aug. 27, 2009

(65) Prior Publication Data
US 2010/0321727 A1    Dec. 23, 2010

(30) Foreign Application Priority Data
Feb. 18, 2008 (JP) ................................. 2008-036635

(51) Int. Cl.
*H04N 1/00* (2006.01)
*G06K 7/00* (2006.01)

(52) U.S. Cl.
USPC .......... 358/403; 358/1.15; 358/1.16; 358/1.1; 382/317; 382/312

(58) Field of Classification Search
USPC ......... 358/1.1, 1.9, 1.11–1.18, 400–404, 448, 358/449, 296; 707/706, 722; 399/84
See application file for complete search history.

(56) References Cited

U.S. PATENT DOCUMENTS

| | | | |
|---|---|---|---|
| 5,887,088 A * | 3/1999 | Kurokawa et al. | 382/317 |
| 5,982,502 A * | 11/1999 | Jinnai | 358/296 |
| 7,599,084 B2 | 10/2009 | Mitani | |
| 2005/0198380 A1* | 9/2005 | Panasyuk et al. | 709/239 |

(Continued)

FOREIGN PATENT DOCUMENTS

| | | | |
|---|---|---|---|
| JP | 9247430 A | | 9/1997 |
| JP | 09247430 A | * | 9/1997 |

(Continued)

OTHER PUBLICATIONS http://h10025.www1.hp.com/ewfrf/wc/document?lc=ja&cc=jp&dlc=ja&product=324247&docname=c00096576.

(Continued)

*Primary Examiner* — Chad Dickerson
(74) *Attorney, Agent, or Firm* — Harness, Dickey & Pierce, PLC

(57) ABSTRACT

A text print instructions sheet generation unit embeds, in a text print instructions sheet, identification information for specifying a text print instructions sheet after being converted into image data. A sheet data management unit manages layout information that associates the identification information for specifying the text print instructions sheet with the identification information of a document included in a retrieval result. An image analysis unit extracts the identification information for specifying a sheet from the image data, specifies the layout information managed by the sheet data management unit based on the extracted identification information, and performs image analysis based on the specified layout information.

12 Claims, 19 Drawing Sheets

(56) References Cited

U.S. PATENT DOCUMENTS

| | | |
|---|---|---|
| 2006/0012835 A1 | 1/2006 | Shimizu |
| 2006/0116993 A1* | 6/2006 | Oguri et al. .................. 707/3 |
| 2007/0035782 A1 | 2/2007 | Mitani |
| 2007/0299827 A1 | 12/2007 | Kojima |
| 2008/0291502 A1* | 11/2008 | Horikawa ................ 358/448 |

FOREIGN PATENT DOCUMENTS

| | | |
|---|---|---|
| JP | 2005-254535 | 9/2005 |
| JP | 2006-31465 | 2/2006 |
| JP | 2006150791 A | 6/2006 |
| JP | 2006-244302 A | 9/2006 |
| JP | 2007-049412 A | 2/2007 |
| JP | 2007-241649 A | 9/2007 |
| JP | 2008-3900 | 1/2008 |
| JP | 2008-293221 A | 12/2008 |

OTHER PUBLICATIONS

International Search Report.
Japanese Office Action mailed Mar. 1, 2011.

* cited by examiner

FIG.2G

LIST OF PRINTED DOCUMENTS

☆ A A A

☆ B B B

☆ C C C

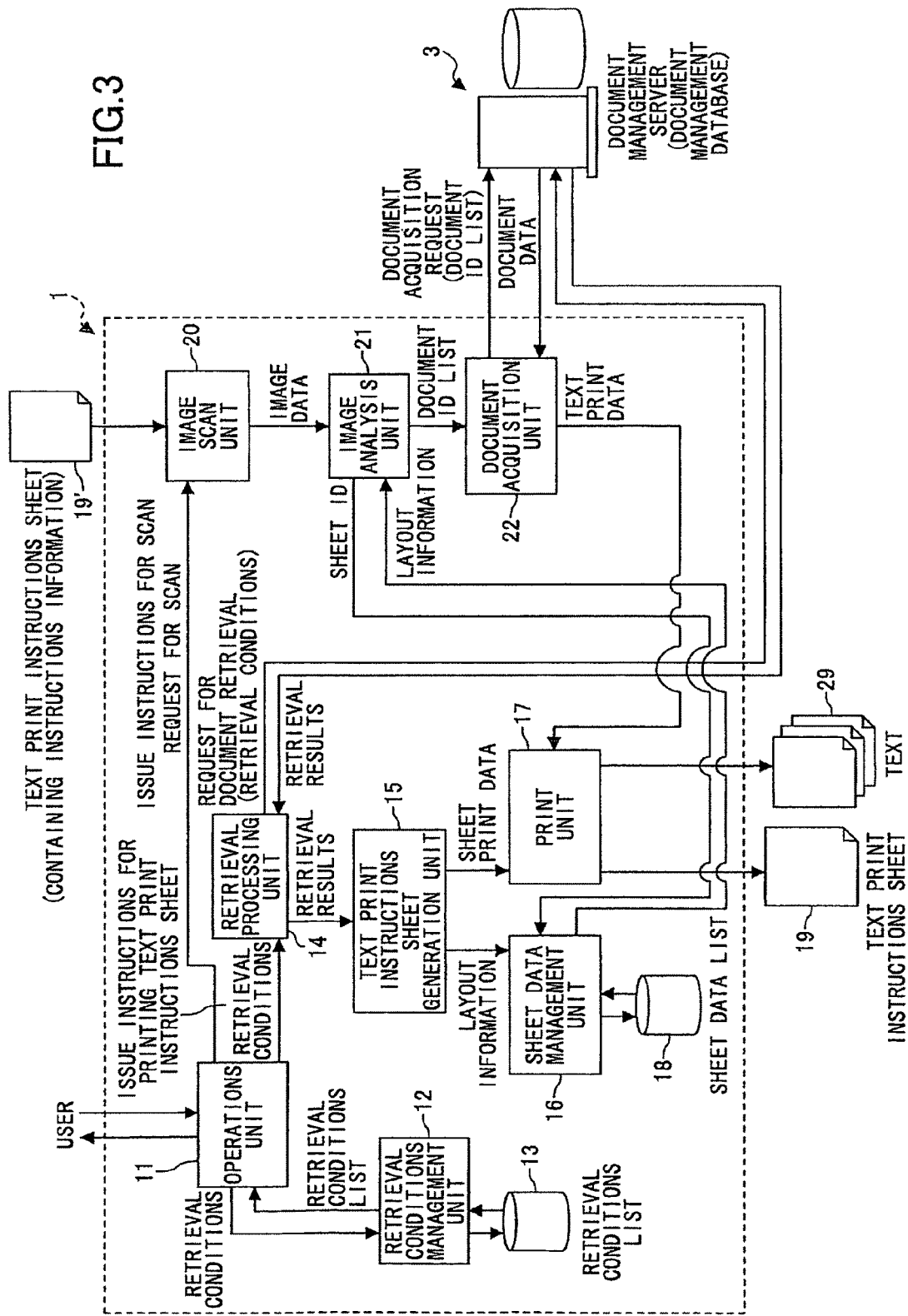

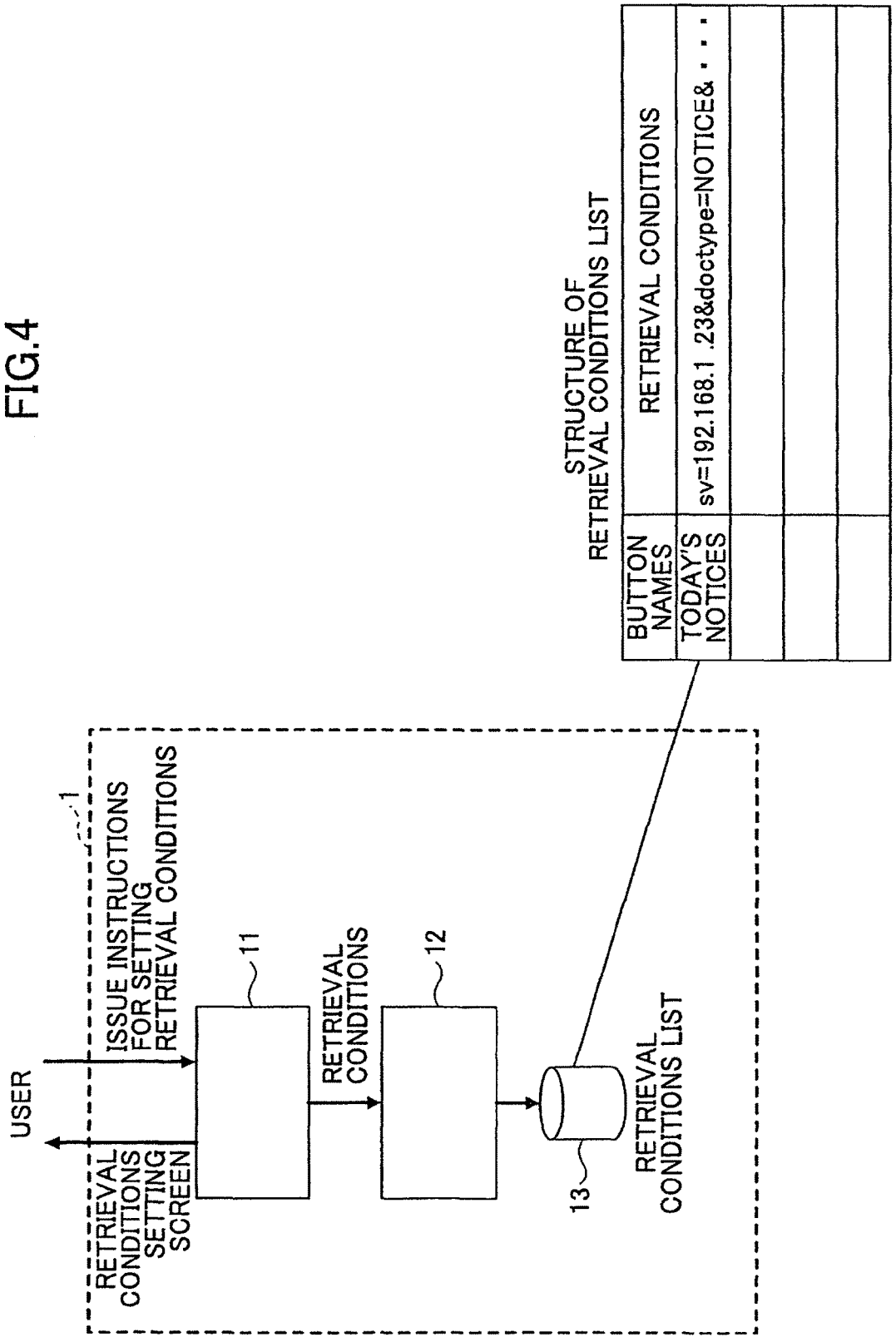

FIG.5

SETTING OF RETRIEVAL CONDITIONS

DOCUMENT MANAGEMENT SERVER: http://192.168.123/documentserver/ [REFERENCE]

CONDITIONS BETWEEN ITEMS: ● AND  ○ OR

DOCUMENT CATEGORIES: NOTICES ▶

DOCUMENT TYPES: ACCOUNTING ▶

REGISTRATION DATES: FROM PREVIOUS BUSINESS DAY TO TODAY ▶

BUTTON NAMES: DOCUMENTS OF TODAY'S NOTICES    [KEYBOARD]

[SETTING]   [CANCEL]

FIG.8

| DOCUMENT IDS | TITLES | SUMMARIES | REGISTRATION DATES | DOCUMENT CATEGORIES | DOCUMENT TYPES |
|---|---|---|---|---|---|
| 000123 | ABOUT PAYMENT PROCESSING AT TERM END | PROCEDURE OF PAYMENT PROCESSING FOR OUTSIDE COMPANIES AT THIS TERM END HAS BEEN CHANGED. | 2007/09/27 | NOTICE | ACCOUNTING |
| 000148 | TRANSMITTAL OF CLOSING STATEMENTS | ... | 2007/09/27 | NOTICE | ACCOUNTING |
| ... | ... | | | | |

TEXT PRINT INSTRUCTIONS SHEET

| TITLES | SUMMARIES | DOCUMENT PRINT |
|---|---|---|
| ABOUT PAYMENT PROCESSING AT TERM END | PROCEDURE OF PAYMENT PROCESSING FOR OUTSIDE COMPANIES AT THIS TERM END HAS BEEN CHANGED. | ☐ |
| TRANSMITTAL OF CLOSING STATEMENTS | AS OF TODAY .... | ☐ |
| ××××××× | ..... | ☐ |
| ××××××× | ..... | ☐ |
| | | |
| | | |

FIG.10

| SHEET IDS | LAYOUT DATA | | |
|---|---|---|---|
| 0000000001 | x=100,y=120,h=10,w=10,docid=00123<br>x=100,y=160,h=10,w=10,docid=00148<br>x=100,y=200,h=10,w=10,docid=00272<br>... | | |
| 0000000002 | x=100,y=120, ...<br>... | | |
| ... | | | |

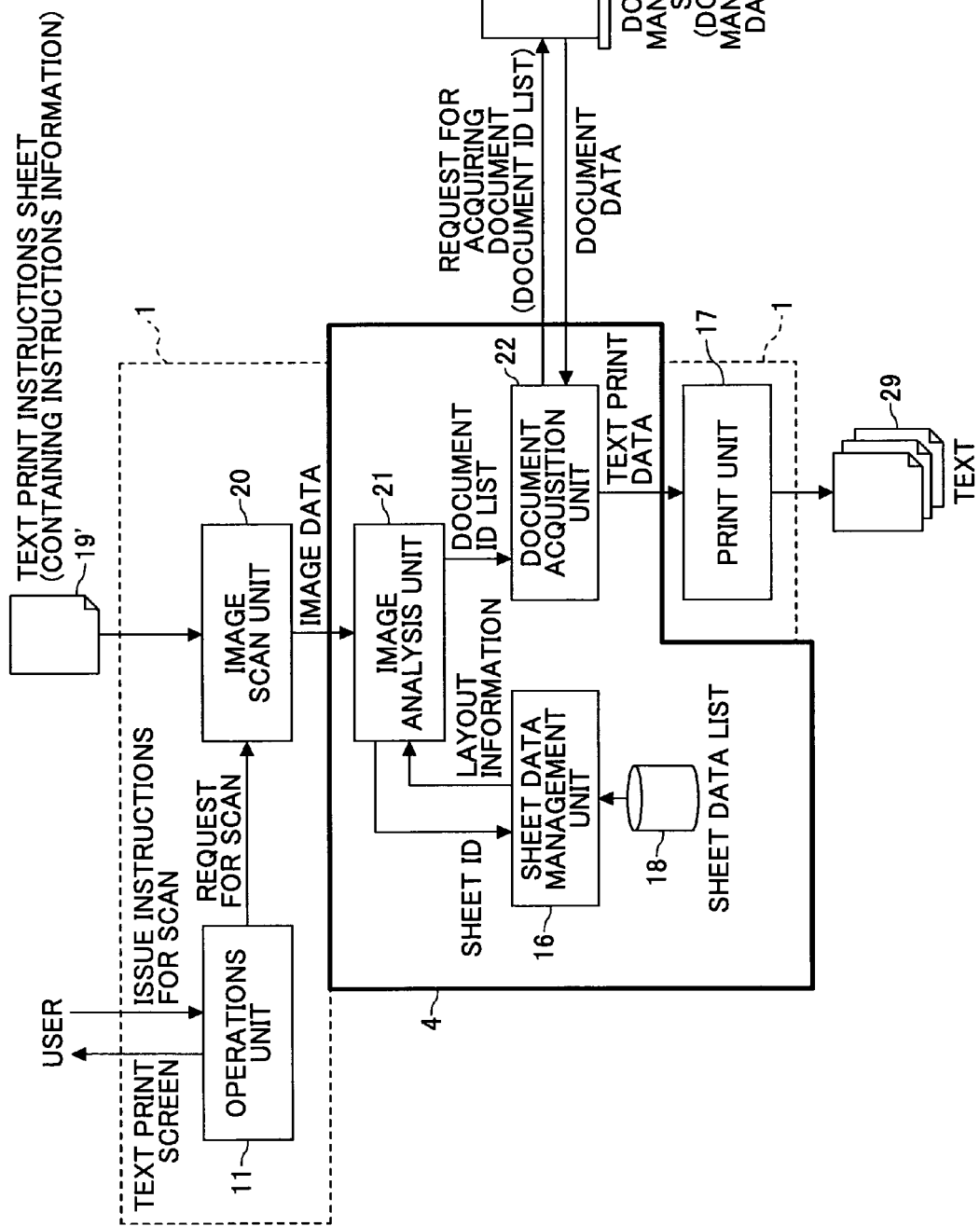

DOCUMENT RETRIEVING/PRINTING SYSTEM, DIGITAL MULTI-FUNCTION MACHINE, DOCUMENT RETRIEVING/PRINTING METHOD, AND PROGRAM

TECHNICAL FIELD

The present invention relates to an easy-to-use document retrieving/printing system cooperating with an EIP, a digital multi-function machine, a document retrieving/printing method, and a program.

BACKGROUND ART

With the development of information systems and the widespread use of networks, many companies have the tendency of issuing notices and instructions from their headquarters to branch offices/sales offices by sending electronic documents via networks. Particularly, an information shared system (document management system) called an Enterprise Information Portal (EIP) has become widespread. In cooperation with, for example, the EIP, the branch offices can retrieve necessary information and receive notices from the headquarters by accessing a central Web server. As a result, information can be transmitted and widely known to employees faster than it is printed on documents and physically distributed.

On the other hand, the main business that is conducted at the sales offices are sales activities. Therefore, there is almost no need to use personal computers, and the sales offices do not generally provide the personal computer for every employee. In such a case, when notices and instructions are transmitted from the headquarters, persons in charge or the like at the sales offices download and print necessary electronic documents by accessing the central Web server. In this manner, the notices and the instructions are given to and generally known to relevant employees.

However, the operations of accessing the Web server, downloading the necessary documents, and printing the documents become very troublesome and time-consuming when there are a number of documents to be handled or when accumulated labor hours in one week or one month and the proportion of the time of the operations to labor hours are considered.

In order to reduce the labor, the present inventor has completed a system, a method, and the like for allowing users to collectively print and output necessary documents in simple operations by using a digital multi-function machine.

In this connection, for example, Patent Document 1 discloses an invention that allows users to reduce the labor of specifying one out of an enormous amount of document data when they wish to specify and print the document data and that hides document data for which the users do not have an access right. Here, with history information storage processing, a printing apparatus stores history information about printing processing for documents 1 and 2 operated by a user A, which contains identification information for discriminating processed document data. Then, when a user B presses a button 002 for "specifying one out of recently used documents" on a document operations screen 800, the printing apparatus determines whether the user B has an access right for the data of the documents (documents 1 and 2) corresponding to the identification information contained in the history information. As a result of this determination, the printing apparatus displays a list screen 1001 for allowing the user B to select the document data (document 1) for which the user B has the access right and prints the document data involved (see the abstract of Patent Document 1).

More specifically, Patent Document 1 discloses a document management system having a document management server that manages document data and client equipment that accesses the document management server and performs document processing of the document data in accordance with operations by the user. In the document management system, the client equipment has an authentication unit that performs authentication for the user; a history information storage unit that stores history information about the document processing containing identification information for discriminating the document data subjected to the document processing; a user access right determination unit that determines whether the authenticated user has an access right for the document data corresponding to the identification information contained in the history information; a display unit that performs display for allowing the user to select the document data for which the authenticated user has the access right; and a document processing unit that performs the document processing of the document data selected by the user.

In addition, Patent Document 1 discloses a document processing control method of a document management system having a document management server that manages document data and client equipment that accesses the document management server and performs document processing of the document data in accordance with operations by the user. The document processing control method has an authentication step of performing authentication for the user with the client equipment; a history information storage step of storing history information about the document processing containing identification information for discriminating the document data subjected to the document processing with the client equipment; a user access right determination step of determining whether the authenticated user has an access right for the document data corresponding to the identification information contained in the history information with the client equipment; a display step of performing display for allowing the user to select the document data for which the authenticated user has the access right with the client equipment; and a document processing step of performing the document processing of the document data selected by the user with the client equipment. Moreover, Patent Document 1 discloses a document management apparatus and a program (see the claims of Patent Document 1).

However, according to the technology disclosed in Patent Document 1, all the documents for which the user has the access right are hit (retrieved) depending on the presence or absence of the access right for document information. Because a system cooperating with the EIP essentially has an access right, it is allowed to view most of the documents or all the documents stored in a server according to circumstances. Therefore, in case that the user selects a document to be printed through an operations unit while a large amount of documents are stored in a document management server, even a list of the documents is caused to have a huge amount of information. As a result, the operation of selecting necessary information out of the huge amount of information becomes very complicated. Accordingly, Patent Document 1 does not specifically describe what solution means should be taken and how the problems are solved.

Patent Document 2 discloses a document management system that allows a handwritten comment or the like to be added as the attribute information of an electronic document by allowing a comment or the like to be described in instructions during operations in a sheet document and to be stored in the document management system. The document management system stores the electronic document and the attribute information related to the electronic document with an electronic document storage unit and generates the instructions that record the attribute information related to the electronic document so as to be extractable by an image input device. The instructions have a message region in which a descriptive message from an operator can be entered after the instructions are printed and stored as the attribute information of the document in the electronic document storage unit.

More specifically, Patent Document 2 discloses the document management system having the electronic document storage unit that stores the electronic document and the attribute information related to the electronic document; and an instructions generation unit that generates the instructions recording the attribute information related to the electronic document so as to be extractable by the image input device. The instructions generated by the instructions generation unit has the message region in which the descriptive message from the operator can be entered after the instructions are printed and stored as the attribute information of the document in the electronic document storage unit. In addition, Patent Document 2 discloses a document management method and a document management program (see clams of Patent Document 2).

According to this technology, the user is allowed to issue processing contents to the document management system by writing data in the printed instructions in handwriting and scanning the instructions.

However, the document management system does not have the function of retrieving documents and dynamically generating instructions based on retrieval results. Therefore, the document management system cannot be applied to a case in which only a necessary document is printed.

Non-Patent Document 1 discloses an all-in-one type multi-function machine in which a printer and a scanner are integrated together. Here, when a memory card in which photo images taken by a digital camera are recorded is inserted into the multi-function machine, a thumbnail list of the photo images in the memory card can be printed in a format called a photo sheet. Then, when a mark scanning area near the thumbnail of the printed photo sheet is filled and scanned, the corresponding photo images are printed. In other words, it is only necessary to have the function of printing and scanning an OMR (Optical Mark Reader) sheet including a thumbnail for OMR processing and printing the corresponding photo images.

Patent Document 1: JP-A-2006-244302
Patent Document 2: JP-A-2007-241649
Non-Patent Document 1: http://h10025.www1.hp.com/ewfrf/wc/document?lc=ja&cc=jp&dlc=ja&product=324247&docname=c00096576

However, when the function disclosed in Non-Patent Document 1 is directly applied to a document management database shared on a network, the user is required to print a list of all the documents and select a necessary document out of them as in the case of Patent Document 1. Particularly, Non-Patent Document 1 does not describe specific solution means as to how the operating procedures are taken when a large amount of documents are stored in the document management database. As a result, operations per se become tremendously complicated.

DISCLOSURE OF INVENTION

The present invention has been made in light of the above circumstances and may provide a document retrieving/printing system that allows the user to download one out of a large amount of document information while reducing a large amount of operating labor and to retrieve a necessary document and output the same so as to be printed while saving labor. Also, the present invention may provide a digital multi-function machine, a document retrieving/printing method, and a program for the document retrieving/printing system.

According to one aspect of the present invention, there is provided a document retrieving/printing system in which a desired one of documents stored and managed in a document management server is selected for printing and outputting. The system includes a retrieval processing unit that transmits the retrieval condition of a document such as the desired document to the document management server storing and managing the documents and obtains a retrieval result from the document management server; a text print instructions sheet generation unit that generates a text print instructions sheet and layout information based on the obtained retrieval result; a sheet data management unit that manages the layout information of the text print instructions sheet; a print unit that prints and outputs the text print instructions sheet and document data acquired from a document acquisition unit; an image scan unit that scans the printed text print instructions sheet to which text print instructions information is added; an image analysis unit that analyzes image data scanned by the image scan unit and specifies a document requested to be printed from the text print instructions information; and the document acquisition unit that acquires the document specified by the image analysis unit from the document management server. The text print instructions sheet generation unit embeds in the text print instructions sheet identification information for specifying the text print instructions sheet after being converted into image data. The sheet data management unit manages the layout information that associates the identification information for specifying the text print instructions sheet with the identification information of the document included in the retrieval result. The image analysis unit extracts the identification information for specifying a sheet from the image data, specifies the layout information managed by the sheet data management unit based on the extracted identification information, and performs image analysis based on the specified layout information.

Preferably, the document retrieving/printing system further includes a retrieval conditions management unit that registers and manages one or more retrieval conditions in advance; and an operations unit through which any one of the registered retrieval conditions is input.

Preferably, the document retrieving/printing system cooperates with an EIP (Enterprise Information Portal).

Preferably, the retrieval condition of the document is extracted from an attribute of the document and used as an element of a retrieval formula.

Preferably, the operations unit, the image scan unit, and the print unit are constituted by a digital multi-function machine, and the other units are constituted by at least one computer.

According to another aspect of the present invention, there is provided a digital multi-function machine used for the document retrieving/printing system described above. The digital multi-function machine includes the operations unit, the image scan unit, and the print unit.

According to still another aspect of the present invention, there is provided a document retrieving/printing method in which a desired one of documents stored and managed in a document management server is selected for printing and outputting. The method includes a retrieval processing step of transmitting the retrieval condition of a document such as the desired document to the document management server storing and managing the documents and obtaining a retrieval result from the document management server; a text print instructions sheet generation step of generating a text print instructions sheet and layout information based on the obtained retrieval result; a sheet data management step of managing the layout information of the text print instructions sheet; a first print step of printing and outputting the text print instructions sheet; an image scan step of scanning the printed text print instructions sheet to which text print instructions information is added; an image analysis step of analyzing image data scanned in the image scan step and specifying a document requested to be printed from the text print instructions information; a document acquisition step of acquiring the document specified in the image analysis step from the document management server; and a second print step of printing and outputting document data acquired in the document acquisition step. In the text print instructions sheet generation step, identification information for specifying the text print instructions sheet is embedded in the text print instructions sheet after being converted into image data. In the sheet data management step, the layout information that associates the identification information for specifying the text print instructions sheet with the identification information of the document included in the retrieval result is managed.

In the image analysis step, the identification information for specifying a sheet is extracted from the image data, the layout information managed in the sheet data management step is specified based on the extracted identification information, and image analysis is performed based on the specified layout information.

Preferably, the document retrieving/printing method includes a retrieval conditions management step of registering and managing one or more retrieval conditions in advance; and an operations step of issuing instructions for performing printing based on input information generated when a user selects and inputs any one of the registered retrieval conditions.

Preferably, the document retrieving/printing method is performed by a digital multi-function machine.

Preferably, the operations step, the image scan step, and the first and second print steps are performed by a digital multi-function machine, and the other steps are performed by a computer apparatus other than the digital multi-function machine.

According to still another aspect of the present invention, there is provided a recording medium having a program that causes a digital multi-function machine to perform the method described above.

According to still another aspect of the present invention, there is provided a recording medium having a program that causes a digital multi-function machine and a computer apparatus to perform the method described above.

An embodiment of the present invention provides a document retrieving/printing system that allows the user to download one out of a large amount of document information while reducing a large amount of operating labor and to retrieve a necessary document and output the same so as to be printed while saving labor. Also, the embodiment of the present invention provides a digital multi-function machine, a document retrieving/printing method, and a program for the document retrieving/printing system.

BRIEF DESCRIPTION OF DRAWINGS

FIGS. 2A through 2G are views for illustrating a brief overview of an example of a method for using the document retrieving/printing system according to the embodiment of the present invention;

FIG. 3 is a block diagram showing an overall configuration example of the document retrieving/printing system according to the embodiment of the present invention;

FIG. 4 is a diagram for illustrating a function related to a retrieval conditions setting used in the document retrieving/printing system according to the embodiment of the present invention when retrieval conditions are set in a digital multi-function machine (client terminal);

FIG. 5 is a retrieval conditions setting screen;

FIG. 8 is a diagram displaying examples of items provided in a document as attributes;

FIG. 10 is a diagram showing an example of a management table in which layout information is added to a sheet data list;

FIG. 16 is a block diagram showing an internal configuration example when parts related to the text print instructions function of the document retrieving/printing system according to the embodiment of the present invention is mainly constituted by the external server.

BEST MODE FOR CARRYING OUT THE INVENTION

Figure 1:
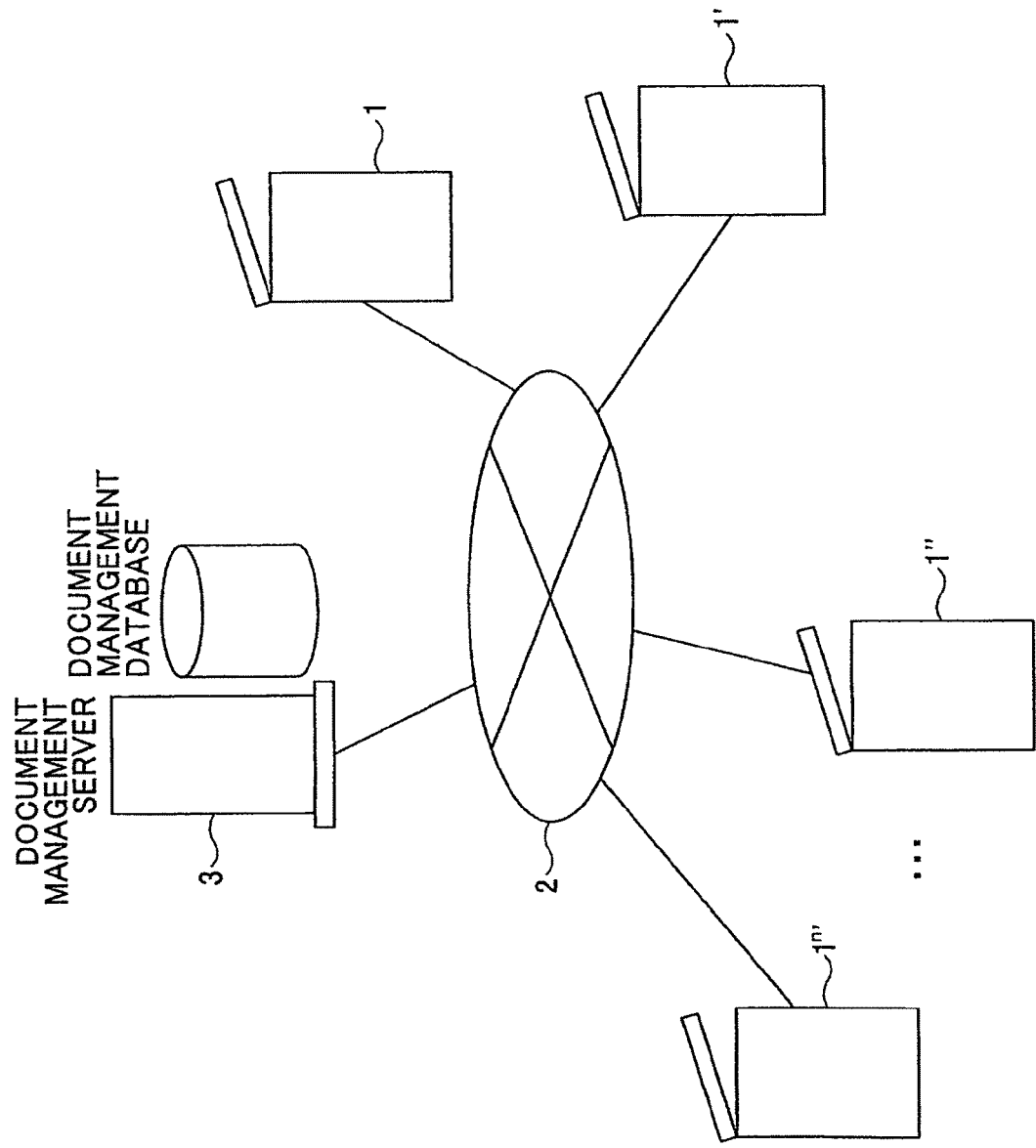
FIG. 1 is a view showing an overall image of hardware resources of a document retrieving/printing system according to a first embodiment of the present invention.

FIG. 1 is a view showing an overall image of hardware resources of a document retrieving/printing system according to a first embodiment of the present invention.

The document retrieving/printing system according to the embodiment of the present invention is composed of a document management server 3 having a document management database and one or more digital multi-function machines 1, 1', 1", 1''', etc., that access the document management server 3 via a network 2. The user uses the system by operating at least one of the digital multi-function machines 1, 1', 1", 1''', etc.

FIGS. 2A through 2G are views for illustrating a brief overview of an example of a method for using the document retrieving/printing system according to the embodiment of the present invention. In order to cause the document retrieving/printing system to start functions as a system, the user has to log into the digital multi-function machine constituting the system. In this login operation, for example, an employee ID provided with an IC function or any item that proves whether the user is authorized to log into the system is used. In the case of the employee ID or the like, information in an IC chip secured in the employee ID is scanned by the digital multi-function machine (for example, the information in the chip is scanned by a scanner) to confirm whether the user is an authorized user. If the user is authorized to log into the system, it is determined that data can be output from the digital multi-function machine and the following operations may be performed. On the other hand, if the user is not an authorized user, the digital multi-function machine can store the history of the unauthorized user and switch to a standby state. Because this system is an easy-to-use document retrieving/printing system cooperating with the EIP, it contains a lot of confidential information between headquarters and sales offices (branch offices). Therefore, those other than an authorized user are expelled from this system. For example, a double (multi) check system may also be employed in which the user having been determined to be an authorized user by the employee ID or the like is subjected to another check using other methods (for example, information containing at least one of image information such as fingerprints, finger veins, face recognition, and body temperatures is used). Even if the user is determined not to be an authorized user, he or she may use other recognition methods such as inputting a password by which the authorized user can be confirmed.

Figure 2A:
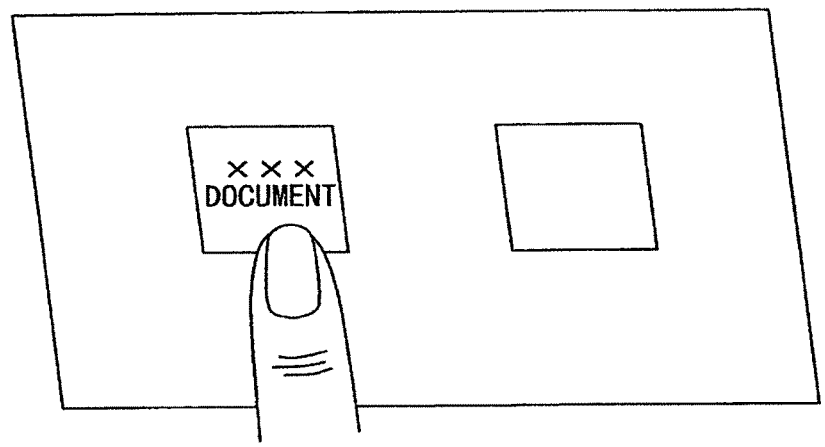

Next, as shown in FIG. 2A, the user of the digital multi-function machine having been determined to be the authorized user presses an "XXX document" button (including a GUI) of the operations unit of the digital multi-function machine and presses a print button to issue print instructions. Next, the digital multi-function machine, to which retrieval conditions allocated to the button are input, retrieves documents from the document management server 1. Then, a list of the documents according to retrieval results is printed from the digital multi-function machine as a text print instructions sheet. The user or the like checks the document to be printed from the list of the documents described on the text print instructions sheet (preferably sets the text print instructions sheet checked by the user onto the feeder of the digital multi-function machine) and issues instructions for performing scanning through the operations unit of the digital multi-function machine. Then, the text of the checked documents (namely, the documents in the list of the documents instructed to be printed) are sequentially output, or they are preferably stapled one by one (preferably, a list of the printed documents is finally printed).

As shown in FIG. 3, the document retrieving/printing system including the document management server 3 according to the embodiment of the present invention has a retrieval processing unit 14, a text print instructions sheet generation unit 15, a sheet data management unit 16, a print unit 17, an image scan unit 20, an image analysis unit 21, and a document acquisition unit 22. The retrieval processing unit 14 transmits retrieval conditions of a document to the document management server 3 and receives retrieval results from the document management server 3. The text print instructions sheet generation unit 15 generates a text print instructions sheet 19 and layout information based on the retrieval results obtained from the retrieval processing unit 14. The sheet data management unit 16 manages the layout information of the text print instructions sheet 19. The print unit 17 prints and outputs the text print instructions sheet 19. The image scan unit 20 scans the image data of a text print instructions sheet 19' obtained by adding print instructions information to the printed text print instructions sheet 19. The image analysis unit 21 analyzes the scanned image data and specifies a document whose text is requested to be printed (the document to which print instructions information is supplied). The document acquisition unit 22 acquires the specified document from the document management server 3. Note that the print unit 17 prints and outputs the acquired document data. According to the embodiment of the present invention, the document retrieving/printing system can further have a retrieval conditions management unit 12 that registers retrieval conditions in advance and an operations unit 11 through which any of the registered retrieval conditions is selected and input.

Particularly preferably, the operations unit 11, the image scan unit 20, and the print unit 17 are constituted by the digital multi-function machine, and the other units are constituted by one or more computers. The other units may (separately) be provided for each computer, or one or more aggregated computers may constitute the units other than the operations unit 11, the image scan unit 20, and the print unit 17, which are described in a system configuration diagram and its descriptions related to FIGS. 14 through 16 below.

Then, the text print instructions sheet generation unit 15 embeds identification information for (uniquely) specifying the text print instructions sheet in the text print instructions sheet. Here, "embedding the identification information in the text print instructions sheet" means coding the identification information for (uniquely) specifying the text print instructions sheet and printing the coded identification information on the text print instructions sheet as image information.

The sheet data management unit 16 used in the document retrieving/printing system according to the embodiment of the present invention manages layout information that associates the identification information of the text print instructions sheet with the identification information of the documents included in the retrieval results.

Furthermore, the image analysis unit 21 extracts identification information for specifying a sheet from the image data, specifies layout information managed in the sheet data management unit 16 based on the extracted identification information, and performs image analysis based on the layout information.

(Function of Setting Retrieval Conditions in this System)

Referring first to FIGS. 2A through 2G and 4, a description is made of a function related to a retrieval conditions setting used in the document retrieving/printing system according to the embodiment of the present invention when retrieval conditions are set in the digital multi-function machine (client terminal) 1.

As shown in FIG. 4, in the system according to the embodiment of the present invention, the internal configuration of the system for the retrieval conditions setting has the operations unit 11 through which the user inputs data; the retrieval conditions management unit 12 that inputs the setting instructions of retrieval conditions indicated by the operations unit 11 to the operations unit 11 and receives the retrieval conditions based on the input setting instructions; and a retrieval conditions list unit 13 that stores or manages the received retrieval conditions as a retrieval conditions list.

In such a function related to the retrieval conditions setting in the document retrieving/printing system according to the embodiment of the present invention, when a system setting request is received from the user, units related to the function for the retrieval conditions setting having the configuration described above display a retrieval conditions setting screen shown in FIG. 5. On the retrieval conditions setting screen, setting instructions for retrieval conditions are received from the user.

As shown in FIG. 5, the document retrieving/printing system according to the embodiment of the present invention is an easy-to-use document retrieving/printing system cooperating with the EIP. A column (the number of condition items) in which the user inputs data so as to perform retrieval is illustrative only. Here, because objects to be retrieved are documents, it is necessary to retrieve condition items as conditions for performing retrieval in such a manner that those provided as attributes (such as document categories and document types) are put in a conditional (retrieval) formula from the viewpoint of document management. In an example shown in FIG. 5, the number of condition items is four, but its retrieval range may appropriately be expanded or narrowed by the use of a sum set (OR condition) and a product set (AND condition). As shown in FIG. 5, the condition items are composed of four columns (document categories, document types, registration dates, and button names). Furthermore, as shown in FIG. 8, the condition items are composed of, for example, the document categories including notices or the like, the document types including accounting or the like, and the registration dates or the like. The document categories include guidance, communications, or the like, in addition to the notices. Furthermore, the document types may be different for each branch office or the like, but it is also possible to make conditions such that retrieval can be performed depending on the presence or absence of the word "YYY system" as the attribute of a document title in addition to a department name such as "accounting" shown in FIG. 8. Furthermore, it is possible to retrieve documents hit by "○□Δ×" (where "□" is a part of a name expression) and "ZZZ development center" as the attributes of "creators," "authorized persons," and "creation departments." Moreover, the condition items (attributes) may include different document creators or different document-related persons such as acknowledgers for posting documents. Thus, the number of condition items can arbitrarily be increased or decreased. Furthermore, the example of FIG. 5 shows only a case in which the condition items are united with each other either by AND or OR so as to perform retrieval when the number of the condition items is four or more. However, the condition items may arbitrarily be set so as to be united with each other by the combination of AND and OR. Note that the button names described above represent operating buttons (button names) such as "today's notices," "manuals," and "sales management" on an operations panel screen shown in FIG. 7. The number and the display of the buttons are illustrative only, and the present invention is not limited to them.

The user inputs conditions by operating the buttons of necessary condition items as to the setting of retrieval conditions and then sets the retrieval conditions by pressing a "setting" button. Note that when the user does not perform the setting, he/she presses a cancel button.

As described above, upon receiving the instructions for setting the retrieval conditions from the user through the operations unit 11, the digital multi-function machine 1 passes the retrieval conditions to the retrieval conditions management unit 12.

Then, the retrieval conditions management unit 12 stores and manages the received retrieval conditions in the retrieval conditions list unit 13 (inside the digital multi-function machine 1) as a retrieval conditions list (the previous step of transmitting the retrieval conditions to the document management server in a retrieval processing step).

As shown in the setting screen for the retrieval conditions of FIG. 5, the address (here, a URL is shown as an example) of the document management server 1 is preferably capable of being set. Accordingly, although one document management server 3 is shown in FIG. 1, it is possible to employ a configuration in which one digital multi-function machine (client terminal) 1 is accessible to plural document management servers 3, 3', etc. Note that when a "reference" button provided next to the URL information of the document management server shown in FIG. 5 is pressed, the URL information of other document management servers present on the Internet can be viewed. In order to access such servers, the URL is specified to thereby make it possible to connect to the document management servers.

(Function of Outputting Text Print Instructions Sheet in this System)

Figure 6:
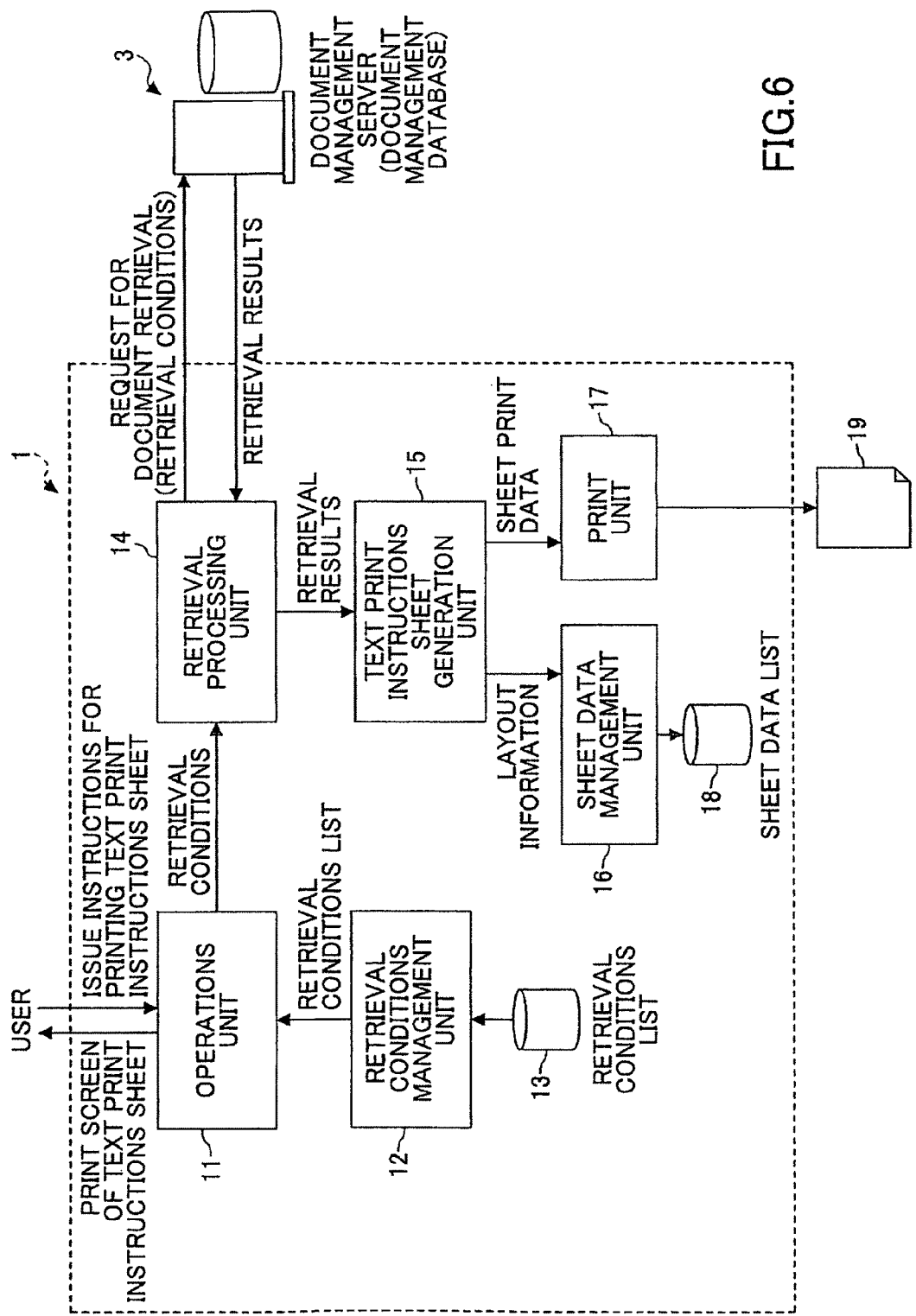
FIG. 6 is a block diagram for illustrating the internal schematic configuration of the digital multi-function machine related to the function of outputting a text print instructions sheet in the document retrieving/printing system according to the embodiment of the present invention.

Referring next to FIG. 6, a description is made mainly of the function of outputting the text print instructions sheet 19 in the document retrieving/printing system according to the embodiment of the present invention based on the internal schematic configuration of the digital multi-function machine 1 and operation examples thereof.

The operations unit 11 acquires a desired retrieval conditions list (including button names) from the retrieval conditions list unit 13 through the retrieval conditions management unit 12. Then, the print screen of the text print instructions sheet shown in FIG. 7, in which buttons are arranged so as to correspond to the list, is displayed on the operations unit 11.

Figure 7:
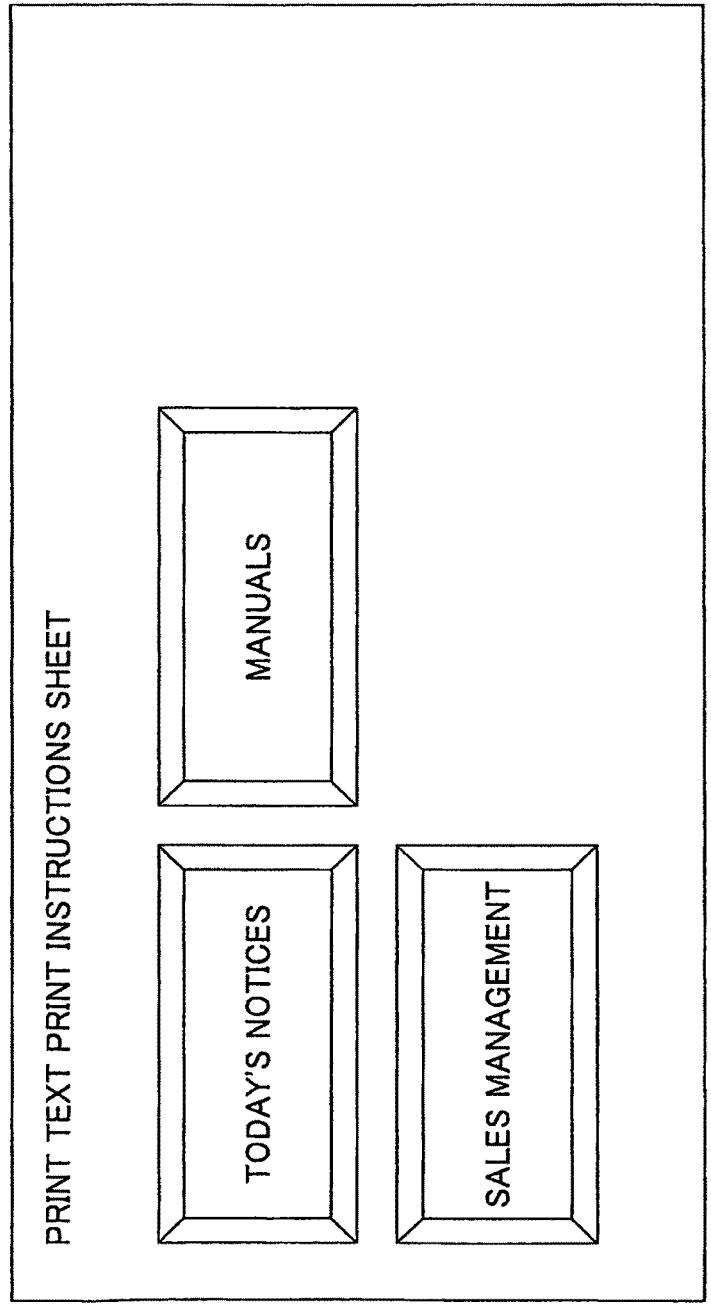
FIG. 7 is a diagram showing examples of button names for a retrieval formula used in the document retrieving/printing system according to the embodiment of the present invention.

When the user presses one of the buttons on the operations unit 11 of the digital multi-function machine 1 shown in FIG. 7 to issue instructions for printing the text print instructions sheet 19, retrieval conditions corresponding to the button specified through the operations unit 11 are transmitted to the retrieval processing unit 14 as shown in the diagram for illustrating the function of outputting the text print instructions sheet 19 in FIG. 6.

The retrieval processing unit 14 transmits a document retrieval request (retrieval conditions) including the retrieval conditions to the document management server 3. Then, the retrieval processing unit 14 receives retrieval results shown, for example, in FIG. 8 from the document management server 3 (the above description refers to a retrieval processing step in which the retrieval processing unit 14 receives the retrieval results using the function of setting retrieval conditions in this system (see FIG. 2A)).

Upon receiving the retrieval results, the retrieval processing unit 14 passes the retrieval results to the text print instructions sheet generation unit 15.

Figure 2B:
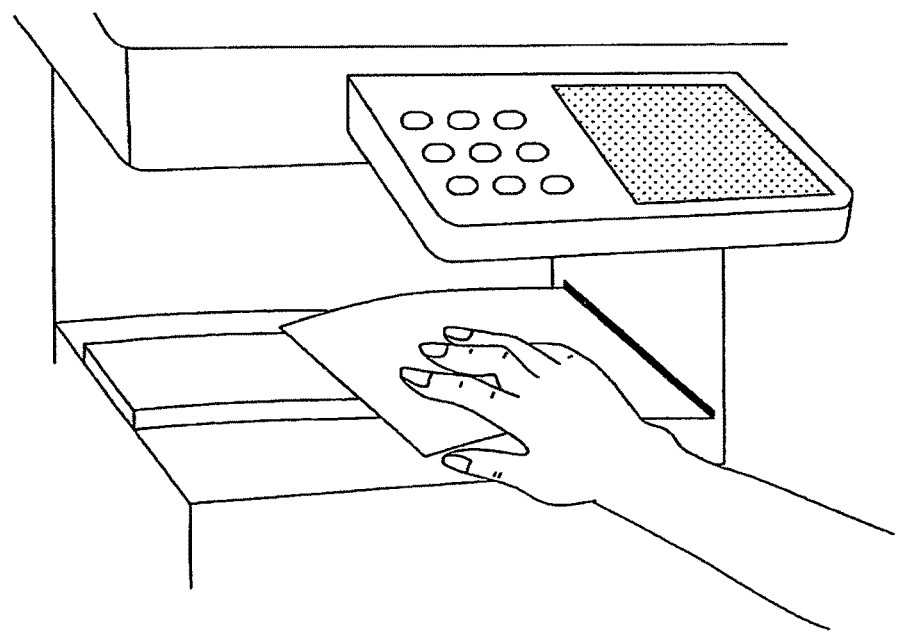

The text print instructions sheet generation unit 15 generates the print data (sheet print data) of the text print instructions sheet 19 in which the retrieval results supplied from the retrieval processing unit 14 and OMR scanning regions are arranged in a list form (the above description refers to as a text print instructions sheet generation step: a step between FIG. 2A and FIG. 2B).

Figure 9:
FIG. 9 is a diagram showing a print data example of a text print instructions sheet printed by a text print instructions sheet generation unit.

In the generated sheet print data, an inherent sheet ID is coded (for example, formed into a QR code) and embedded. In addition, timing marks for accurately performing OMR scanning are included so as to be arranged. For example, as shown in a diagram displayed as a print example of the text print instructions sheet 19 in FIG. 9, the timing marks are indicated as "■" marks placed at three corners other than one corner where a QR code is provided. Note that the expression of "embedding the inherent sheet ID" means converting a sheet ID after being coded into image data such as a QR code and printing the converted image data.

The text print instructions sheet generation unit 15 generates layout information (see the first line shown in FIG. 10) by linking the OMR scanning regions with the document ID of retrieval results and passes the layout information to the sheet data management unit 16. In addition, the text print instructions sheet generation unit 15 passes sheet print data to the print unit 17.

The sheet data management unit 16 adds the received layout information shown in FIG. 10 to the sheet data list 18 and manages the same (the above description refers to a sheet data management step: a step between FIG. 2A and FIG. 2B).

The print unit 17 prints and outputs the received sheet print data (the above description refers to a first print step: see FIG. 2B).

In the above description, the inherent ID embedded in the sheet print data is called the sheet ID, which means an inherent ID for uniquely specifying the retrieval results supplied from the retrieval processing unit 14 (see the sheet ID shown in FIG. 10).

Furthermore, in the above description, the user presses the button through the operations unit 11 to issue the instructions for printing the text print instructions sheet 19. In case that this operation is performed, for example, every day (or performed at a predetermined date (or a predetermined time) of working days), the system may automatically print a text print instructions sheet at a predetermined time every day.

(Function of Issuing Instructions for Printing Text in this System)

Figure 11:
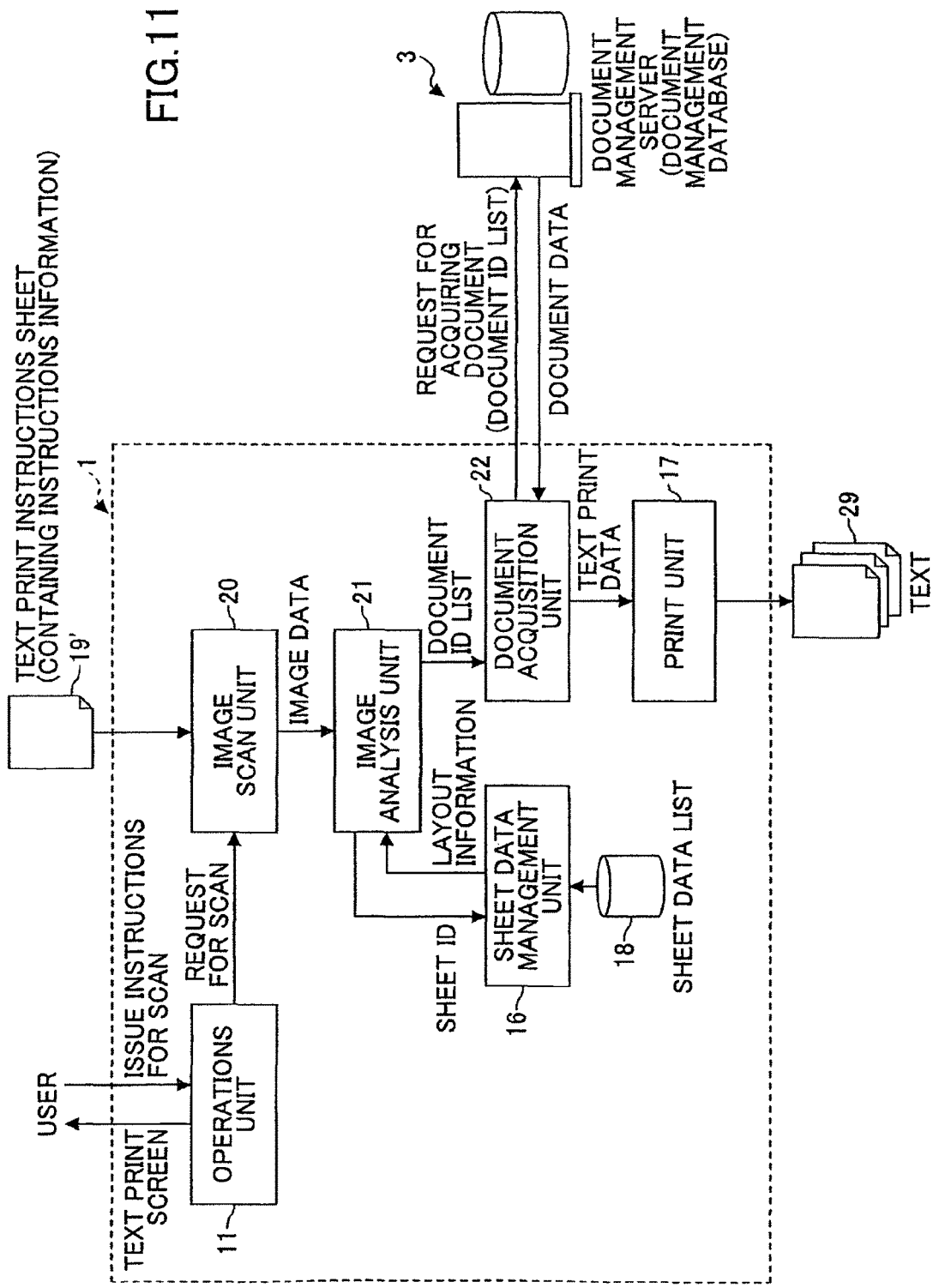
FIG. 11 is a block diagram showing an internal configuration example related to the function of issuing instructions for printing text in the digital multi-function machine (client terminal) 1 according to the embodiment of the present invention.

Referring next to FIG. 11, a description is made of the internal configuration and operations thereof related to the function of issuing instructions for printing text in the digital multi-function machine (client terminal) according to the embodiment of the present invention.

Figure 12:
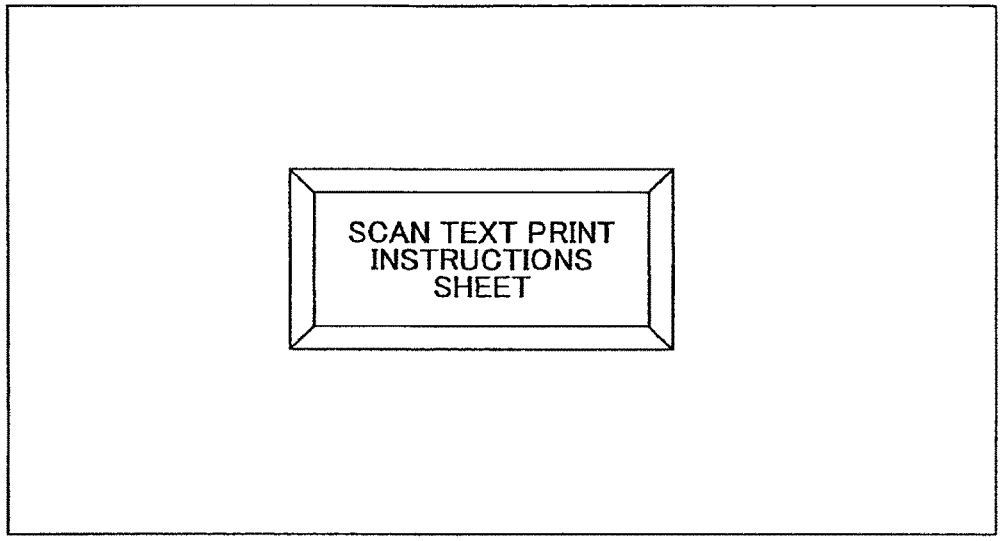
FIG. 12 is a diagram showing a display example of an operations unit in which instructions for scanning from the user are received on a screen.
Figure 13:
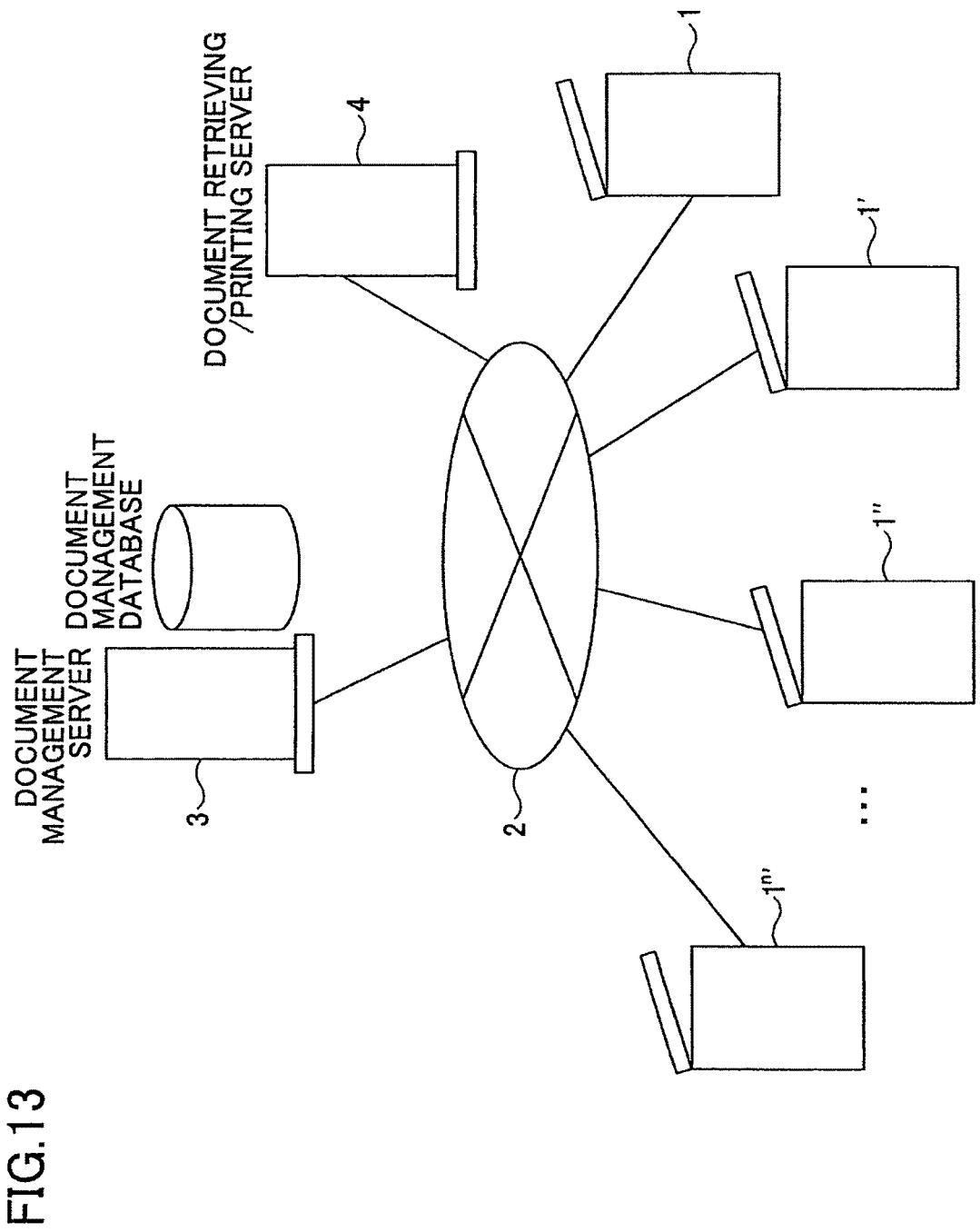
FIG. 13 is a view showing another overall image of hardware resources of the document retrieving/printing system according to the embodiment of the present invention.

Upon receiving instructions for scanning from the user through the print screen of the operations unit 11 shown in FIG. 12, the operations unit 11 transmits a scan request to the image scan unit 20.

Figure 2C:
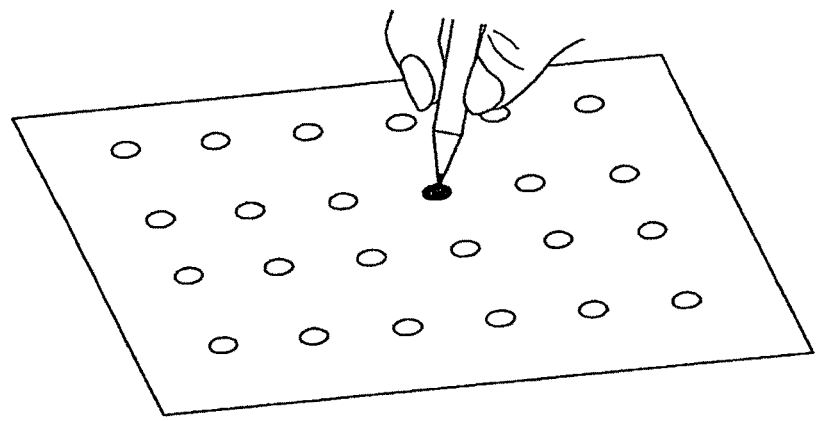
Figure 2D:
Figure 2E:
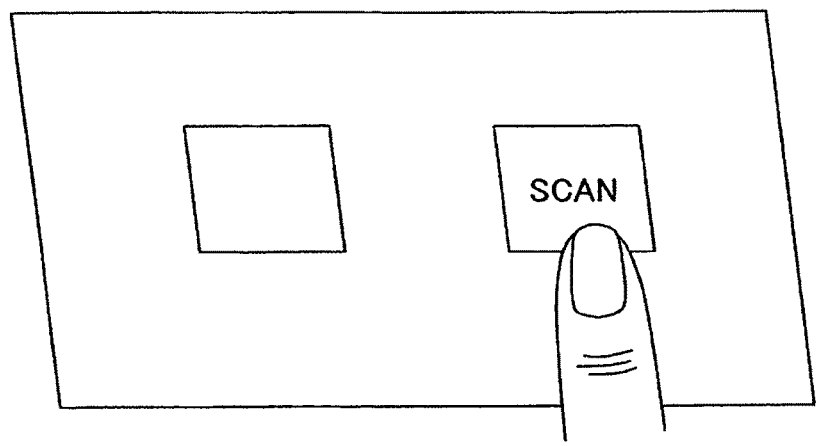

The image scan unit 20 scans a sheet document (a text print instructions sheet 19' to which print instructions information is added) and passes the scanned image data to the image analysis unit 21 (the above description refers to an image scanning step: see FIGS. 2C through 2E).

The image analysis unit 21 retrieves coded information, for example, a QR code from the left corner of the image data and decodes the QR code to obtain a sheet ID. If the image analysis unit 21 cannot find the QR code or cannot obtain the sheet ID, the processing is completed as an error. The image analysis unit 21 passes the sheet ID obtained from the coded image information to the sheet data management unit 16.

The sheet data management unit 16 retrieves layout information corresponding to the received sheet ID from the sheet data list 18 and returns the layout information (the relevant row shown in FIG. 10) to the image analysis unit 21. If the corresponding layout information does not exist, the processing is completed as an error.

Using the timing marks provided at the corners of the image data, the image analysis unit 21 applies, for example, the affine transformation to the image data so as to be corrected. Then, the image analysis unit 21 performs OMR processing on OMR scanning regions based on the layout information received from the sheet data management unit 26. As a result of the OMR processing, a document ID corresponding to the marked OMR scanning region is specified (in an example shown in FIG. 10, a document ID (docid) 000123 is specified when the OMR scanning region, of which x coordinate (x) is 100, y coordinate (y) is 120, height (h) is 10, and width (w) is 10, is marked). The image analysis unit 21 passes the list of the specified document IDs to the document acquisition unit 22 (the above description refers to an image analysis step: a step between FIGS. 2E and 2F).

Figure 2F:
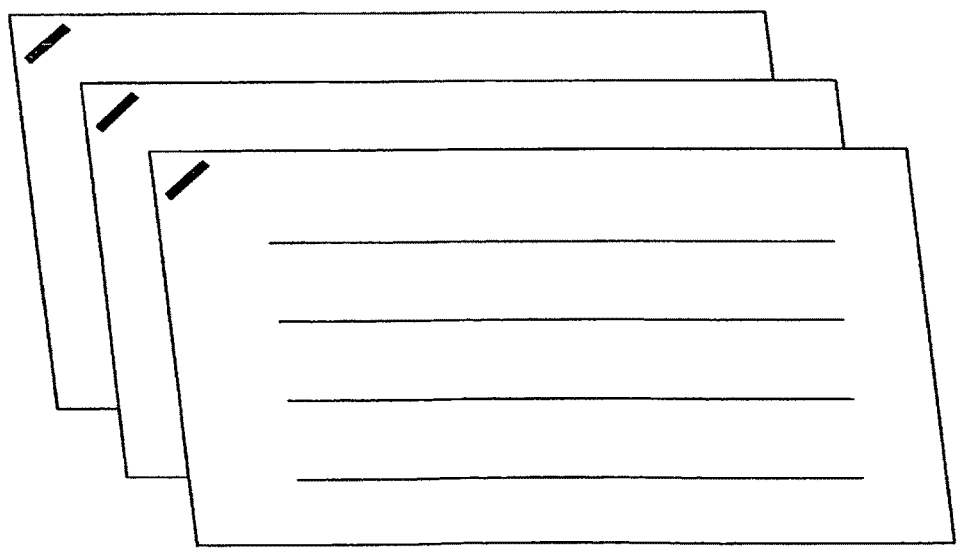

The document acquisition unit 22 transmits a document acquisition request including the list of the document IDs to the document management server 3 and receives (one or more) corresponding document data from the document management server 3 (the above description refers to a document acquisition step: a step between FIGS. 2E and 2F).

Then, the document acquisition unit 22 passes the (one or more) document data as (one or more) text print data to the print unit 17. Furthermore, the document acquisition unit 22 preferably generates data for printing the list of texts to be printed and passes the generated data to the print unit 17.

Figure 2G:
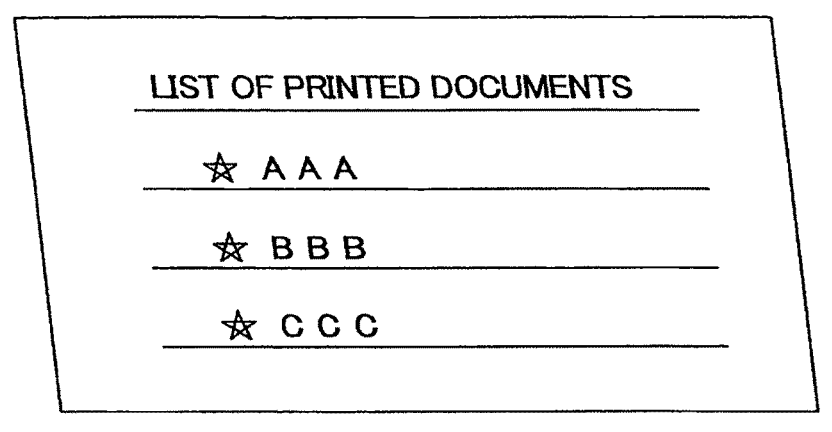

The print unit 17 prints and outputs the (one or more) received print data and staples the printed documents one by one (the above description refers to a second print step: see FIGS. 2F and 2G).

The document retrieving/printing system according to the first embodiment of the present invention is described above. In this embodiment, the operations of the document retrieving/printing system of the present invention are described using the system configuration as an example in a case in which the digital multi-function machine dominates (operates) the main part of the functions of this system.

Second Embodiment (Mainly Based on External Server)

In the above first embodiment, the main processing of the document retrieving/printing system of the present invention is performed by the digital multi-function machine (client terminal). However, it is also possible for a system to include a computer (a document retrieving and printing server) that constitutes the document retrieving/printing system according to the embodiment of the present invention via the network 2 other than the digital multi-function machine except for the processing of inputting and outputting sheets (namely, processing such as performing printing on sheets and obtaining information from sheets as media).

Figure 14:
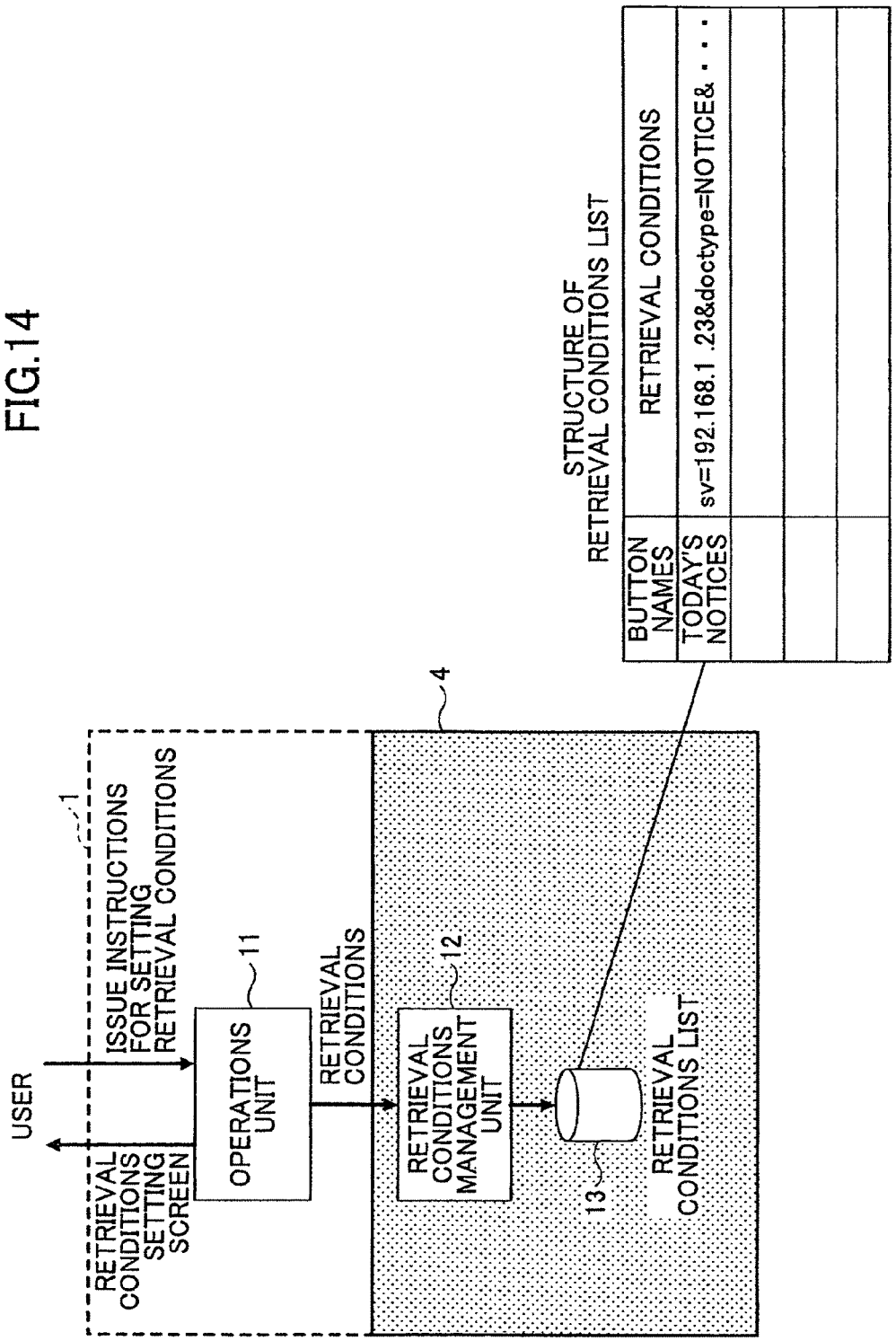
FIG. 14 is a diagram for illustrating a function (mainly based on an external server) related to a retrieval conditions setting used in the document retrieving/printing system according to the embodiment of the present invention when retrieval conditions are set in the digital multi-function machine (client terminal)
Figure 15:
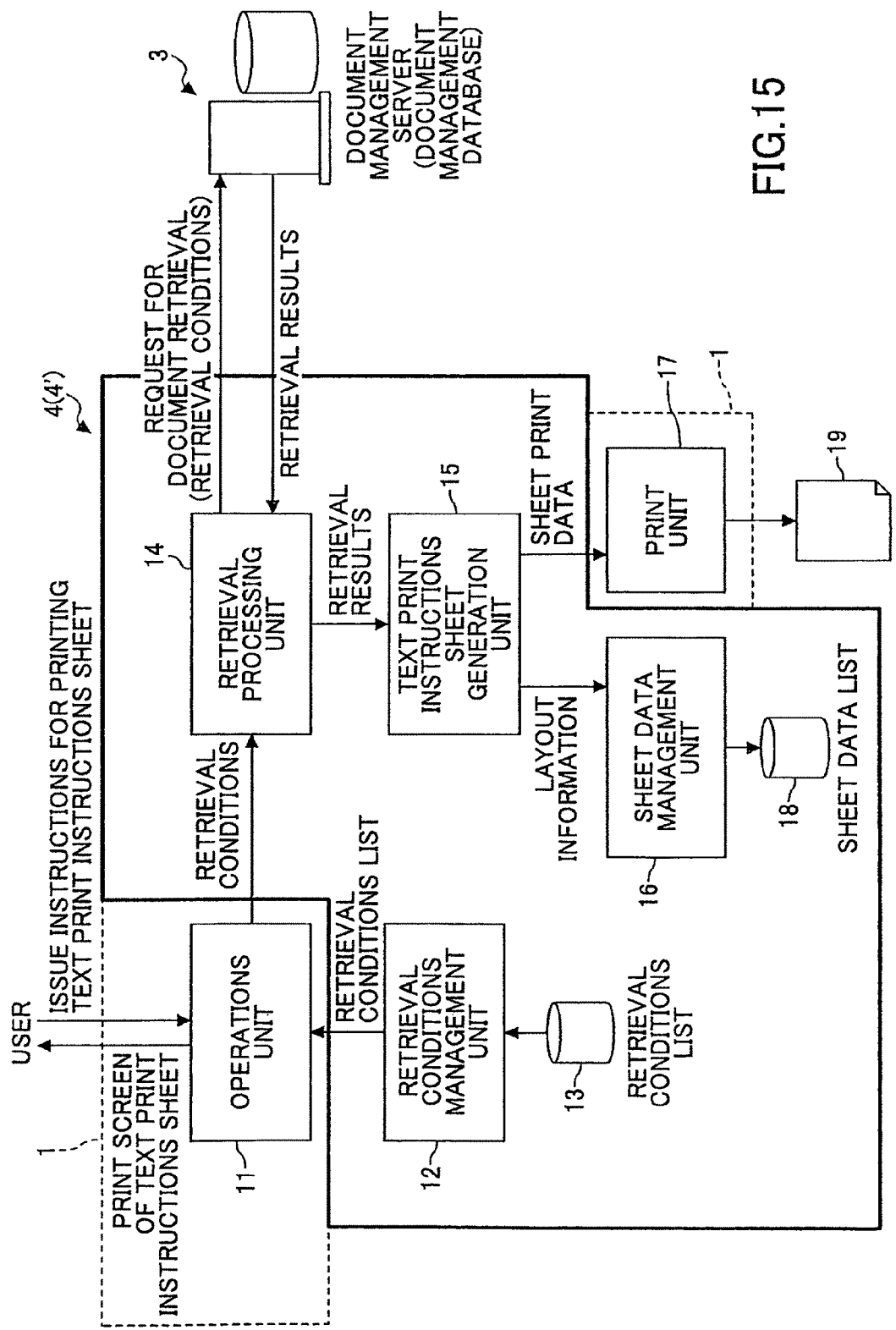
FIG. 15 is a block diagram for illustrating an internal schematic configuration about a function related to the outputting of the text print instructions sheet in the document retrieving/printing system according to the embodiment of the present invention, where the function is mainly based on the external server.

In other words, the configuration examples of the functions of the document retrieving/printing system according to the embodiment of the present invention are respectively illustrated in FIGS. 14 through 16. As shown in FIGS. 14 through 16, only parts encircled by dotted lines may be performed by the digital multi-function machine, and parts encircled by solid lines may be performed by the document retrieving and printing server (the computer (network computer)). These machines perform communications via a network line at the boundary because they have different configurations. However, the processing is the same as that illustrated in the first embodiment. Therefore, the descriptions of the processing are omitted here. Note that the processing itself remains the same in the document retrieving/printing method according to the embodiment of the present invention, but the operating parts of the processing are different in the following descriptions.

Then, the descriptions are made in detail below.

(Retrieval Processing Step)

As shown in FIG. 14, processing until the user inputs retrieval conditions is performed by the operations unit 11 of the digital multi-function machine 1.

Then, the input retrieval conditions are transmitted to the computer 4 connected via a network and stored in the retrieval conditions management unit 12 and the retrieval conditions list unit 13 of the computer 4.

Furthermore, as shown in FIG. 15, the operations unit 11 transmits the retrieval conditions to the retrieval processing unit 14 of a computer 4' (may be the same as the computer 4). The following retrieval processing step is the same as that of the first embodiment.

Note that the user may input the retrieval conditions or the like using the operations unit provided in the computer 4 (or computer 4') instead of the operations unit of the digital multi-function machine. In this case, all the parts (the operations unit 11, the retrieval conditions management unit 12, and the retrieval conditions list unit 13) shown in FIG. 14 are operated by either a single computer 4 or plural computers 4.

(Text Print Instructions Sheet Generation Step)

In this step, as shown in FIG. 15, the retrieval conditions received by the retrieval processing unit 14 of the computer 4 are transmitted to the document management server 3, and then retrieval results are returned to the retrieval processing unit 14 of the computer 4'. In addition, the text print sheet generation unit 15 of the computer 4 (or the computer 4', namely, other computers) similarly operates as in the step of the first embodiment. Note that in this step also, the operations unit 11 may be provided to constitute the computer 4. Moreover, the retrieval processing unit 14 may be provided to constitute the computer 4, and the text print instructions sheet generation unit 15 may be provided to constitute the digital multi-function machine 1.

(Sheet Data Management Step)

In this step, as shown in FIG. 15, the sheet data management unit 16 and the sheet data list unit 18 are provided to constitute the computer 4. However, according to the embodiment of the present invention, the text print instructions sheet generation unit 15, the sheet data management unit 16, and the sheet data list unit 18 may be provided to constitute the digital multi-function machine 1.

(Image Scanning Step)

In this step, the operations of the operations unit 11 may be performed by the computer 4. The digital multi-function machine 1 having received the instructions for performing the operations may perform the operations of the first embodiment.

(Image Analysis Step)

In the configuration shown in FIG. 16, the image analysis unit 21, the sheet data management unit 16, and the sheet data list unit 18 may be provided to constitute the computer 4. However, according to the embodiment of the present invention, the image analysis unit 21 may be provided to constitute the digital multi-function machine 1. Alternatively, the functions of the image analysis unit 21 may be shared by the digital multi-function machine and the computer.

(Document Acquisition Step)

In the configuration shown in FIG. 16, the document acquisition unit 22 other than the image analysis unit 21, the sheet data management unit 16, and the sheet data list unit is also provided to constitute the computer 4. Alternatively, only the document acquisition unit 22 may be provided to constitute the computer 4, or a part of the image analysis unit 21 and the document acquisition unit 22 may be provided to constitute the computer 4.

In the above second embodiment, the document management server and the document retrieving/printing server are described in a logically separated manner, but they may be operated on the same server machine. Alternatively, the document retrieving/printing server may be constituted by at least one computer.

In the document retrieving/printing system according to the embodiment of the present invention, the respective parts as shown in the figures may be realized as programs and installed in hardware resources such as digital multi-function machines and document retrieving/printing servers having a computer function so as to constitute the above system. Furthermore, according to the embodiment of the present invention, a program that operates the document retrieving/printing system may be installed in existing digital multi-function machines and computer apparatuses as an operating program so as to constitute the above system.

The present application is based on Japanese Priority Application No. 2008-036635 filed on Feb. 18, 2008, with the Japan Patent Office, the entire contents of which are hereby incorporated by reference.

The invention claimed is:

1. A document retrieving/printing system in which a document is selected for printing and outputting, the system comprising:

an operations unit that allows input of condition items along with selecting at least one of a product set and a sum set for setting retrieval conditions, a retrieval conditions management unit receives the retrieval conditions when a user sets the retrieval conditions through pressing a setting button on the operations unit, the operations unit acquires a retrieval conditions list from the retrieval conditions management unit, which include a plurality of buttons that are displayed for selection that correspond with the retrieval conditions set, when a user actuates one of the plurality of buttons that correspond to the retrieval conditions list on the operations unit, the retrieval conditions associated with the button that corresponds to the retrieval conditions list are transmitted to the retrieval processing unit, a retrieval processing unit configured to transmit the retrieval conditions of a desired document associated with the actuated button that corresponds to the retrieval conditions list to the document management server and obtains a retrieval result from the document management server based upon the retrieval conditions associated with the button that corresponds to the retrieval conditions list, the desired document being one of a plurality of documents that are stored and managed in a document management server;

a text print instructions sheet generation unit configured to generate a text print instructions sheet and layout information based on the retrieval result;

an image scan unit configured to scan the text print instructions sheet to which text print instructions information is added;

an image analysis unit configured to specify the desired document from the text print instructions information added to the text print instructions scanned by the image scan unit;

a document acquisition unit being configured to acquire the document specified by the image analysis unit from the document management server, wherein the text print instructions sheet generation unit being configured to include in the text print instructions sheet identification information for specifying the text print instructions sheet; and a sheet data management unit being configured to manage the layout information that associates the identification information with the identification information of the desired document included in the retrieval result, and the image analysis unit being configured to specify the layout information managed by the sheet data management unit based on the identification information for specifying the text print instructions sheet scanned by the image scan unit, and perform image analysis based on the specified layout information.

2. The document retrieving/printing system according to claim 1, further comprising:

a retrieval conditions management unit configured to register and manage one or more retrieval conditions in advance; and an operations unit configured to input any one of the registered retrieval conditions.

3. The document retrieving/printing system according to claim 1, wherein the system cooperates with an EIP (Enterprise Information Portal).

4. The document retrieving/printing system according to claim 1, wherein the retrieval condition of the desired document is extracted from an attribute of the desired document and used as an element of a retrieval formula.

5. The document retrieving/printing system according to claim 1, wherein the operations unit and the image scan unit are constituted by a digital multi-function machine, and the other units are constituted by at least one computer.

6. A digital multi-function machine used for the document retrieving/printing system according to claim 1, the digital multi-function machine comprising the operations unit and the image scan unit.

7. A document retrieving/printing method in which a document is selected for printing and outputting, the method comprising:

setting, by an operations unit, retrieval conditions by inputting condition items and selecting at least one of a product set and a sum set for the retrieval conditions;

receiving, by a retrieval conditions management unit, the retrieval conditions when a user sets the retrieval conditions through pressing a setting button on the operations unit;

acquiring, by the operations unit, a retrieval conditions list from the retrieval conditions management unit, which include a plurality of buttons that are displayed for selection that correspond with the retrieval conditions set;

actuating, at the operations unit, one of the plurality of buttons that correspond to the retrieval conditions list;

transmitting, at the operations unit, the retrieval conditions associated with the button that corresponds to the retrieval conditions list;

transmitting, by a retrieval processing unit, the retrieval conditions of a desired document associated with the actuated button that corresponds to the retrieval conditions list to the document management server and obtaining a retrieval result from the document management server based upon the retrieval conditions associated with the button that corresponds to the retrieval conditions list, the desired document being one of a plurality of documents that are stored and managed in a document management server;

generating, by a text print instructions sheet generation unit, a text print instructions sheet and layout information based on the retrieval result;

scanning, by an image scan unit, the text print instructions sheet to which text print instructions information is added;

specifying, by an image analysis unit, the desired document from the text print instructions information added to the text print instructions sheet scanned by the image scan unit;

acquiring, by a document acquisition unit, the document specified from the document management server;

including, by the text print instructions sheet generation unit, identification information for specifying the text print instructions sheet in the text print instructions sheet;

managing, by a sheet management unit, the layout information that associates the identification information with the identification information of the desired document included in the retrieval result; and specifying, by the image analysis unit, the layout information managed by the sheet management unit based on the identification information for specifying the text print instructions sheet scanned by the image scan unit, and performing image analysis based on the specified layout information.

8. The document retrieving/printing method according to claim 7, further comprising:

registering and managing one or more retrieval conditions in advance; and issuing instructions for performing printing based on input information generated when a user selects and inputs any one of the registered retrieval conditions.

9. The document retrieving/printing method according to claim 7, wherein the document retrieving/printing method according to claim 7 is performed by a digital multi-function machine.

10. The document retrieving/printing method according to claim 8, wherein the steps of issuing instructions for performing printing and scanning the text print instructions sheet are performed by a digital multi-function machine, and the other steps are performed by a computer apparatus other than the digital multi-function machine.

11. A non-transitory recording medium having a program that causes a digital multi-function machine to perform the method according to claim 7.

12. A non-transitory recording medium having a program that causes a digital multi-function machine and a computer apparatus to perform the method according to claim 8.

* * * * *